(12) United States Patent
Seo

(10) Patent No.: US 8,307,264 B2
(45) Date of Patent: Nov. 6, 2012

(54) DETECTION APPARATUS

(75) Inventor: Yuzo Seo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 12/510,839

(22) Filed: Jul. 28, 2009

(65) Prior Publication Data

US 2010/0031097 A1 Feb. 4, 2010

(30) Foreign Application Priority Data

Jul. 29, 2008 (JP) ................................. 2008-194487

(51) Int. Cl.
*G11C 29/00* (2006.01)
(52) U.S. Cl. ....................... 714/772; 702/107
(58) Field of Classification Search .................. 714/772; 702/107

See application file for complete search history.

(56) References Cited

U.S. PATENT DOCUMENTS

| | | | | | |
|---|---|---|---|---|---|
| 4,458,322 | A | * | 7/1984 | Veale | 702/87 |
| 5,581,488 | A | * | 12/1996 | Seo | 702/107 |
| 2003/0090422 | A1 | * | 5/2003 | Diament | 343/700 MS |
| 2008/0075215 | A1 | * | 3/2008 | Dong et al. | 375/355 |

FOREIGN PATENT DOCUMENTS

| | | |
|---|---|---|
| JP | 2006-170837 A | 6/2006 |
| JP | 2008-509414 A | 3/2008 |

* cited by examiner

*Primary Examiner* — Guy Lamarre
(74) *Attorney, Agent, or Firm* — Canon USA, Inc., IP Division

(57) ABSTRACT

A detection apparatus detecting an error component contained in two signals (A, B) approximated by a cosine and sine functions representing an object position, the detection apparatus including an arithmetic portion (3, 4) which reduces an error contained in the signals (A, B) based on an error prediction value to output two error correction signals (A*, B*), a phase arithmetic portion (5) which calculates a phase (θ) based on the error correction signals (A*, B*), an arithmetic storage unit (9, 10) which stores the error correction signals (A*, B*) and a plurality of sampling values of the phase (θ), and a Fourier transform portion (11, 12) which obtains coefficients $\alpha_k$, $\beta_k$, $\gamma_k$, and $\delta_k$ in the following two expressions:

$$A^* = \alpha_0 + \alpha_1 \cos\theta + \beta_1 \sin\theta + \ldots + \alpha_k \cos k\theta + \beta_k \sin k\theta$$

$$B^* = \gamma_0 + \gamma_1 \cos\theta + \delta_1 \sin\theta + \ldots + \gamma_k \cos k\theta + \delta_k \sin k\theta$$

(k ≧ 2)

wherein the arithmetic portion (3, 4) updates the error prediction value using the coefficients.

3 Claims, 1 Drawing Sheet

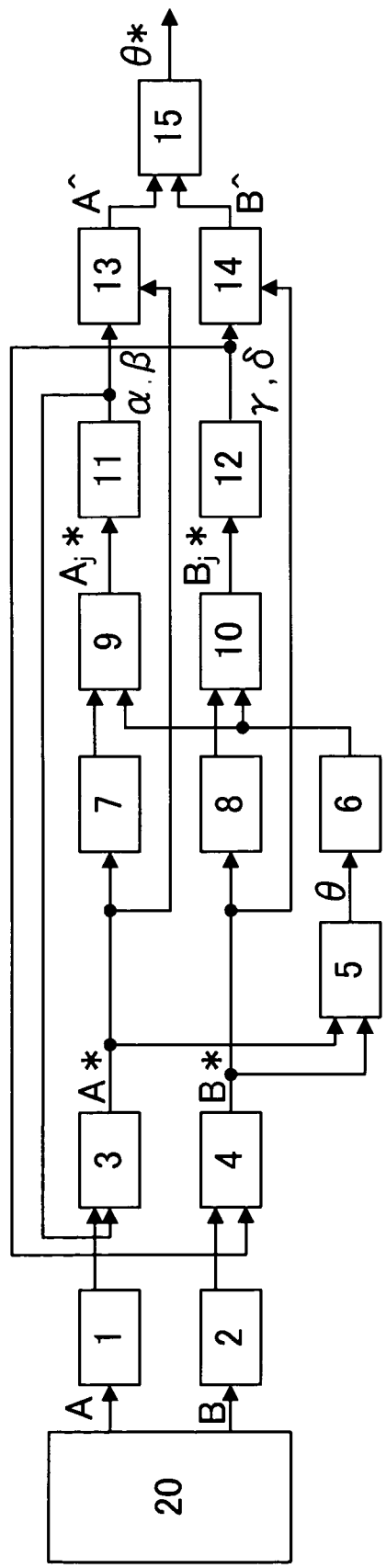

DETECTION APPARATUS

BACKGROUND OF THE INVENTION

1. Field of the Invention

The present invention relates to a detection apparatus which detects an error component contained in two position signals approximated by a cosine function and a sine function representing a position of an object to be detected.

2. Description of the Related Art

A detection apparatus which detects error components contained in two position signals approximated by a cosine function and a sine function which represent a position or an angle is industrially used in the wide range of fields such as an encoder or an interferometer. These position signals are approximated by two expressions, for example, $A = G\cos\theta$ and $B = G\sin\theta$.

These position signals are converted to digital signals using an A/D converter, and an arctangent calculation is performed using a micro processing unit (MPU) or a digital signal processor (DSP). According to these calculations, a value (phase $\theta$) proportional to the position or the angle can be obtained with high resolution.

An offset error, an amplitude error, or the like is contained in the signal outputted from the detector. As a detection apparatus which corrects these errors to perform detection, for example, U.S. Pat. No. 4,458,322 has been known. Furthermore, as another technology for correcting an error, for example, U.S. Pat. No. 5,581,488 has been proposed. U.S. Pat. No. 5,581,488 discloses a method for correcting an error caused by a phase difference error, a second order distortion, and a third order distortion, in addition to the offset error or the amplitude error.

The position signal outputted from the detector contains an error component constituted by a various kind of frequency components, which are different from the ideal cosine function and sine function. For example, the signal which is obtained by dividing two position signals outputted from a head of the detector by an amplitude G is represented by expressions 1 and 2 below. The coefficients will be explained later.

$$A/G = \cos\theta + Z_A + g\cos\theta + h\sin\theta + \ldots + p_k\cos k\theta + q_k\sin k\theta \quad (1)$$

$$B/G = \sin\theta + Z_B - g\sin\theta + h\cos\theta + \ldots + r_k\cos k\theta + s_k\sin k\theta \quad (2)$$

As a result, it is recognized that the position signal (with phase $\theta$) that is an obtained position or angle contains a various kind of error components. The conventional detection apparatus (error correction technology) has performed correction independently for each error factor. Therefore, there has been a problem that the detection apparatus is extremely complicated in order to deal with a lot of error factors.

BRIEF SUMMARY OF THE INVENTION

The present invention provides a highly accurate detection apparatus which corrects a detection error caused by a high order component.

A detection apparatus as one aspect of the present invention is configured to detect an error component contained in two signals approximated by a cosine function and a sine function representing a position of an object to be detected. The detection apparatus includes an arithmetic portion configured to determine an error prediction value to reduce an error contained in the two signals based on the error prediction value and to output two error correction signals, a phase arithmetic portion configured to calculate a phase which represents the position of the object to be detected based on the two error correction signals, a storage portion configured to store the two error correction signals and a plurality of sampling values of two error correction signals at a plurality of phases, and a Fourier transform portion configured to obtain coefficients $\alpha_k$, $\beta_k$, $\gamma_k$, and $\delta_k$ of each term in two expressions representing the two error correction signals by performing a Fourier transform using the plurality of sampling values, the two expressions being represented as follows:

$$A^* = \alpha_0 + \alpha_1\cos\theta + \beta_1\sin\theta + \ldots + \alpha_k\cos k\theta + \beta_k\sin k\theta$$

$$B^* = \gamma_0 + \gamma_1\cos\theta + \delta_1\sin\theta + \ldots + \gamma_k\cos k\theta + \delta_k\sin k\theta,$$

where $A^*$ and $B^*$ are the two error correction signals, $\theta$ is a phase between the signals, and k is equal to or greater than 2. The arithmetic portion is configured to update the error prediction value iteratively using the coefficients in each term of the two expressions.

Further features and aspects of the present invention will become apparent from the following description of exemplary embodiments with reference to the attached drawings.

BRIEF DESCRIPTION OF THE DRAWING

FIG. 1 is a detection block diagram of a detection apparatus in the present embodiment.

DETAILED DESCRIPTION OF THE PREFERRED EMBODIMENTS

Exemplary embodiments of the present invention will be described below with reference to the accompanied drawing.

A detection apparatus of the present embodiment is a detection apparatus that detects an error component contained in two signals approximated by a cosine function and a sine function which represent a position of an object to be measured. The detection apparatus of the present embodiment suppresses a detection error caused by a high order component contained in each position signal.

The present invention is preferably constituted by using a digital arithmetic unit because a complicated signal processing is involved. Therefore, first, the position signal outputted as an analog signal is converted into a digital signal by an A/D converter. A bit width of the A/D converter can be selected in accordance with required resolution and the A/D converter that has a width of 8 to 18 bits is generally used.

In the present embodiment, while a phase $\theta$ of the detector changes between 0 to $2\pi$, a lot of detection value is necessary. Therefore, the conversion speed (i.e. the sampling frequency) of the A/D converter is preferably high enough to detect a large proportion of the detection values. Generally, highly accurate detection is required while an object to be detected moves at low speed. Therefore, there is practically no problem even if an error correction is stopped if the A/D conversion cannot follow the moving speed.

However, commonly, the error correction is preferably performed in a broader range. Therefore, as an A/D converter which is used for the detection apparatus of the present embodiment, for example, a high-speed A/D converter such as a successive-approximation type A/D converter is used. In the present embodiment, an A/D conversion frequency is preferably set to equal to or higher than 100 kHz, but is not limited to this.

A digital signal outputted from the A/D converter can be processed using a micro processing unit (MPU) or a digital signal processor (DSP). However, it is realistic that such a high-speed processing as the present embodiment is performed by a pipeline processing using a gate array.

Recently, a various kind of programmably rewritable FPGAs (Field Programmable Gate Arrays) can be obtained. When using the FPGA, a high-speed pipeline digital signal processor using a gate array can be constituted even in the case of a small lot production.

Before the signal processing, an error component contained in the digitalized position signal is removed. This is because an angle correction using a Fourier coefficient is an approximation and therefore it is difficult to correct the error with high accuracy if a large amount of errors are contained. The removal of the error is, for example, performed by constituting a logic circuit for calculating expressions 3 and 4 below.

$$A^* = A/G - Z_A - g \cos\theta - h \sin\theta \quad (3)$$

$$B^* = B/G - Z_B + g \sin\theta - h \cos\theta \quad (4)$$

Appropriate values may be used as initial values of G, $Z_A$, $Z_B$, g, and h (error prediction values). If the appropriate values are unknown, these initial values can be set to zero. These initial values can be corrected (updated) using first-order and second-order Fourier coefficients described later.

A phase θ can be given by predicting a value of the phase θ at the next sampling time using a tilt of a time regression coefficient of the phase θ for a previous obtained phase θ. The sine function and the cosine function are realized by table lookup using a ROM.

Subsequently, the phase θ is obtained by performing an arctangent calculation using A* and B* (from expressions (3) and (4) above). It is necessary to obtain values over a range of 0 to 2π in the arctangent calculation.

An algorithm for computing the arctangent can be implemented, for example, using a function such as the ATAN2 function in C language. A detailed outline of an algorithm for computing the arctangent in this embodiment is as follows. First, each sign and the magnitude relation are stored, and a smaller signal is divided by a larger signal after both of them are converted into absolute values. The division result is treated as an index and an angle between them is obtained by using an arctangent table in a range of 0 to π/4. Based on the sign and the magnitude relation previously stored, an algorithm that extends to the range of 0 to 2π can be constituted.

Because the Fourier transform are performed by the FFT algorithm, it is preferable that A* and B* are calculated by sampling at points where one period of the signal is equally divided into $2^M$ (M≧3). If the speed of the A/D converter is sufficiently higher than a fluctuation period of the position signal, a signal value at a point which is the closest to an ideal point can be used. However, in the present embodiment, in order to certainly suppress a noise, the following method is preferably performed.

The regression calculation for obtaining the angle θ used for correcting the error can be performed by holding a lot (i.e. a batch) of previous values. However, in order to easily perform the regression calculation, the Kalman filter is preferably used. Although the method by the Kalman filter is known, its algorithm will be described in brief as follows.

Independent variables θ, A*, and B* are represented as x. Because these values may increase or decrease without limit, the width of a register required for holding these values is huge if these values are directly used. Therefore, these values are preferably dealt with as a difference with respect to the latest value $x_0$.

The time is preferably represented as a value that is incremented by one per a previous sampling interval on the condition that the current time is zero. The regression expression in adopting such a representation method is given by the following expression 5, where c and b are regression coefficients.

$$p(x-x_0) = c + bkp \quad (5)$$

Here, p is $2^{-N}$ (N: natural number) and corresponds to a magnitude of the sample used for the regression. When the sampling number is too large, the value is extremely different from the straight line to be obtained by the regression, and therefore, the regression error is large. Such a phenomenon is generated in the movement with high speed. The regression calculation has an effect that suppresses a noise contained in each of values. However, when the value of p is large and the sampling number is small, the effect can not be adequately produced. When a plurality of Kalman filters in which the values of p are different from each other are prepared and the apparatus is configured to switch a regression coefficient to be used in accordance with the moving speed, the calculation can be always performed with an optimal sampling size.

The regression coefficient is obtained by performing repeat calculations using the following expressions 6 to 10 each time new data is obtained.

$$q = f'_x 31 \, p\Delta x \quad (6)$$

$$b = V'_{x,k} + pq \quad (7)$$

$$V_{x,k} = (1-p)b \quad (8)$$

$$f_x = (1-p)q \quad (9)$$

$$c = f_x - V_{x,k} \quad (10)$$

Here, q is a working signal line or a working register, $f_x$ and $V_{x,k}$ are filter values maintained inside the apparatus, and each filter value to which a dash (') is attached is a filter value that is a previously calculated result.

When the values of b and c are obtained by the calculation using expressions 6 to 10, the values of phase θ, A, and B at an arbitrary time can be calculated by applying these coefficients to the above regression expressions. The time k when the phase θ shows a specific value can also be calculated (k in this case includes fractional values).

In the present embodiment, $A_j^*$ and $B_j^*$ that are values of A* and B*, respectively, at points where a range of 0 to 2π of the phase θ is equally divided into $2^M$ (M≧3) are stored. In this case, the previously stored values can be completely rewritten or only a part of them can also be changed by the calculation using the following expressions 11 and 12. A detection apparatus which suppresses the influence of the noise can be provided by performing such a processing.

$$A_j^* = A_j' + r(A_j - A_j') \quad (11)$$

$$B_j^* = B_j' + r(B_j - B_j') \quad (12)$$

In the present embodiment, when the configuration of the detection apparatus which switches the value of p in accordance with the moving speed is adopted, the value of r is preferably changed in synchronization with the switching of the value of p. In other words, when the moving speed is low and a large sampling size is selected, the value of r can be set to a large value because the noise contained in $A_j$ and $B_j$ is expected to be adequately suppressed. Accordingly, a following capability for the error variation can be improved.

In the present embodiment, the phase θ has only to be stored in a range of 0 to 2π. However, as seen in a signal of two-reflection laser interferometer, if an error component of one period is contained per two periods of the signal, the phase θ is preferably stored in a range of 0 to 4π. Accordingly, an error component of ½ period can be separately observed in addition to an ordinary high order component, and the error component can also be corrected by the same algorithm as that described above.

The combination of Fourier coefficients $\alpha_k$, $\beta_k$, $\gamma_k$, and $\delta_k$ for representing A* and B* in the following expressions 13 and 14 can be obtained by performing the FFT (Fast Fourier Transform) calculation with respect to $A_j$ and $B_j$ stored by using the above method.

$$A^* = \alpha_0 + \alpha_1 \cos\theta + \beta_1 \sin\theta + \alpha_2 \cos 2\theta + \beta_2 \sin 2\theta + \ldots + \alpha_k \cos k\theta + \beta_k \sin k\theta \quad (13)$$

$$B^* = \gamma_0 + \gamma_1 \cos\theta + \delta_1 \sin\theta + \gamma_2 \cos 2\theta + \delta_2 \sin 2\theta + \ldots + \gamma_k \cos k\theta + \delta_k \sin k\theta \quad (14)$$

Thus, the errors contained in A* and B* can be corrected by the following expressions 15 and 16.

$$A\hat{0} = (A^* - \alpha_0 - \beta_1' \sin\theta - \alpha_2 \cos 2\theta - \beta_2 \sin 2\theta - \ldots - \alpha_k \cos k\theta - \beta_k \sin k\theta)/\alpha_1 \quad (15)$$

$$A\hat{0} = (B^* - \gamma_0 - \gamma_1' \sin\theta - \gamma_2 \cos 2\theta - \delta_2 \sin 2\theta - \ldots - \gamma_k \cos k\theta - \delta_k \sin k\theta)/\gamma_1 \quad (16)$$

Here, $\beta_1' = \gamma_1' = (\beta_1 + \gamma_1)/2$ is satisfied. This is because the phase calculated from $A\hat{0}$ and $B\hat{0}$ is changed if $\beta_1' - \gamma_1'$ is not zero.

The coefficients G, g, $Z_A$, $Z_B$, and h (error prediction values) used for the error correction at the input stage are corrected (updated) using the above coefficients as represented by the following expressions 17 to 21.

$$G = G + w(\alpha_1 + \delta_1) \quad (17)$$

$$g = g + w(\alpha_1 - \delta_1) \quad (18)$$

$$Z_A = Z_A + w\alpha_0 \quad (19)$$

$$Z_B = Z_B + w\gamma_0 \quad (20)$$

$$h = h + w(\beta_1 + \gamma_1)/2 \quad (21)$$

Here, w is a relaxation coefficient, and is a predetermined constant in a range of 0 to 1. When the value of the relaxation coefficient w is larger, the error correction coefficient at the input stage is rapidly appropriated. However, in this case, it is easily affected by the noise or the like. Because the signal distortion can also be corrected at the rear stage, the error correction at the input stage does not have to be perfectly performed. Therefore, in the present embodiment, the value of the relaxation coefficient w is preferably set to the range of 0.01 to 0.1.

Next, a method for correcting a detection error in the detection apparatus of the present embodiment will be described. FIG. 1 is a detection block diagram of the detection apparatus in the present embodiment.

In FIG. 1, reference numeral 20 denotes a detection portion which detects a position of an object to be detected to output two position signals A and B. The detection portion 20 is, for example, an encoder, and it outputs two-phase position signals whose phases are different by 90 degrees from each other. The two-phase position signals A and B are ideally represented as G cos θ and G sin θ (G: amplitude, θ: phase), respectively.

The position signals A and B outputted from the detection portion 20 are analog signals and are inputted to A/D converters 1 and 2, respectively. The A/D converters 1 and 2 convert the position signals A and B that are analog signals into digital signals to be outputted.

These digital signals are inputted to arithmetic units 3 and 4 (arithmetic portions), respectively. The arithmetic units 3 and 4 determine an error prediction value, and remove an error component contained in these digital signals based on the error prediction value to produce output signals A* and B* (two error correction signals).

The signal A* (error correction signal) outputted from the arithmetic unit 3 is inputted to a first arctangent arithmetic unit 5 and a regression arithmetic unit 7. The signal B* (error correction signal) outputted from the arithmetic unit 4 is also inputted to the first arctangent arithmetic unit 5 (which is a phase arithmetic portion) and a regression arithmetic unit 8.

The first arctangent arithmetic unit 5 (phase arithmetic portion) calculates a phase θ which represents a position of an object to be detected based on the signals A* and B* (two error correction signals) inputted from the arithmetic unit 3 and 4 to be outputted. The phase θ outputted from the first arctangent arithmetic unit 5 is inputted to a regression arithmetic unit 6.

The regression arithmetic unit 6 is a first order regression arithmetic unit which calculates a regression coefficient of the phase θ. Regression arithmetic units 7 and 8 are second order regression arithmetic units which calculate regression coefficients of signals A* and B*, respectively. The regression coefficient of the signal A* and the phase 0 calculated by the regression arithmetic units 6 and 7 is inputted to an arithmetic storage unit 9 (storage portion). The regression coefficient of the signal B* and the phase 0 calculated by the regression arithmetic units 6 and 8 is inputted to an arithmetic storage unit 10 (storage portion).

The arithmetic storage unit 9 performs sampling of the values of the signal A* at a phase jπ/8 (0≦j≦15) and the phase θ to store a combination of a plurality of sampling values obtained by the sampling. Similarly, the arithmetic storage unit 10 performs sampling of the values of the signal B* at a phase jπ/8 (0≦j≦15) and the phase θ to store a combination of a plurality of sampling values obtained by the sampling.

In the present embodiment, j is set to the range between 0 and 15, but the embodiment is not limited to this. In accordance with the required accuracy, the maximum value of j may be set to a value smaller than 15 or equal to or larger than 16. In the present embodiment, Fourier transform is performed as described later, and in this case, the sampling is preferably performed at phases where 2π is equally divided into $2^M$ (M≧3). The arithmetic storage units 9 and 10 output signals $A_j^*$ and $B_j^*$ sampled at a predetermined phase to FFT arithmetic units 11 and 12 (Fourier Transform portions), respectively.

The FFT arithmetic unit 11 calculates coefficients αk and βk of each term (each of cosine and sine terms) of each order in the above expression 13 by performing the Fourier transform using the signal $A_j^*$ (sampling value) inputted from the arithmetic storage unit 9. Similarly, the FFT arithmetic unit 12 calculates coefficients $\gamma_k$ and $\delta_k$ of each term (each of cosine and sine terms) of each order in the above expression 14 by performing the Fourier transform using the signal $B_j^*$ (sampling value) inputted from the arithmetic storage unit 10.

Thus, the FFT arithmetic units 11 and 12 perform Fourier transform to obtain the two expressions represented by expressions 13 and 14 using a plurality of sampling values sampled by the arithmetic storage units 9 and 10, respectively, to obtain coefficients $\alpha_k$, $\beta_k$, $\gamma_k$, and $\delta_k$ of each term in the two expressions. The obtaining of the plurality of values for A*

(and B*) is illustrated by the arrow in FIG. 1 going from the output of FFT arithmetic unit 11 (12) back to the input of arithmetic unit 3 (4).

The coefficient calculated by the FFT arithmetic unit 11 is inputted to a correction arithmetic unit 13 (correction portion). The signal A* that is an output signal of the arithmetic unit 3 is inputted to the correction arithmetic unit 13 (as shown by an arrow in FIG. 1). The correction arithmetic unit 13 corrects the signal A* so that the error contained in the signal A* is reduced by using the coefficients of each term calculated by the FFT arithmetic unit 11 to output the corrected signal A$\hat{\theta}$.

Similarly, the coefficient calculated by the FFT arithmetic unit 12 is inputted to a correction arithmetic unit 14 (correction portion). The signal B* that is an output signal of the arithmetic unit 4 is inputted to the correction arithmetic unit 14. The correction arithmetic unit 14 corrects the signal B* so that the error contained in the signal B* is reduced by using the coefficients of each term calculated by the FFT arithmetic unit 12 to output the corrected signal B$\hat{\theta}$.

Thus, the correction arithmetic units 13 and 14 correct the two signals A* and B* using the coefficients $\alpha_k$, $\beta_k$, $\gamma_k$, and $\delta_k$, respectively.

The coefficients of the cosine and sine terms of each order calculated by the FFT arithmetic units 11 and 12 correspond to an error amount contained in each of the signals $A_j^*$ and $B_j^*$. Therefore, the detection apparatus of the present embodiment feeds back these coefficients to each of the arithmetic units 3 and 4 to perform a control so as to reduce these coefficients by updating the error prediction values maintained in the arithmetic units 3 and 4 using these coefficients. The feedback and iterative improvement of the correction coefficients $\alpha_k$, $\beta_k$, $\gamma_k$, and $\delta_k$ is shown in FIG. 1 by an arrow from the output of each of FFT arithmetic units 11 and 12 back to the inputs of the arithmetic units 3 and 4 respectively.

The signals A$\hat{\theta}$ and B$\hat{\theta}$ corrected by the correction arithmetic units 13 and 14 are inputted to a second arctangent arithmetic unit 15, and a phase $\theta^*$ is calculated by the second arctangent arithmetic unit 15. The phase $\theta^*$ calculated by the second arctangent arithmetic unit 15 is a phase in which a detection error has been corrected, and the detection apparatus of the present embodiment performs a position detection of the object to be detected by treating the corrected value as a measured value.

When detecting the position or the angle, the detection apparatus of the present embodiment can efficiently predict a various kind of error components contained in the position signal to correct the error components. Therefore, it can be used in a wide range of industrial fields of the detection and control of the position or the angle.

As described above, according to the present embodiment, since the detection error caused by high order components is corrected, a highly accurate detection apparatus can be provided.

Furthermore, according to the present embodiment, a signal distortion contained in two position signals approximated by the cosine function and the sine function can be automatically detected to estimate the error contained in the position or the angle caused by the distortion. Therefore, the position or the angle can be detected with high accuracy by subtracting the estimated error.

The present embodiment uses, among other things, the Fourier transform, and an apparatus which is optimal for the wide range of purposes in the industrial world can be constituted by selecting the order. Although high accuracy can be obtained by using up to high order terms, a simple apparatus can also be constituted by using only low order terms if the accuracy is not required so much.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

For example, the present embodiment uses the correction arithmetic units 13 and 14 which correct two signals A* and B*, but is not limited to this. Instead of this, a correction arithmetic unit which corrects a phase $\theta$ can also be used. In this case, another correction arithmetic unit which inputs a phase $\theta$ outputted from the first arctangent arithmetic unit 5 and each coefficient outputted from the FFT arithmetic units 11 and 12 is used. The object to be detected can be detected using the corrected phase $\theta^*$ outputted from the correction arithmetic unit.

This application claims the benefit of Japanese Patent Application No. 2008-194487, filed on Jul. 29, 2008, which is hereby incorporated by reference herein in its entirety.

What is claimed is:

1. A detection apparatus configured to detect a position of an object to be detected based on two signals, the two signals being respectively approximated by a cosine function and a sine function, the apparatus comprising:
an arithmetic portion configured to reduce an error of each of the two signals based on an error prediction value to output two error correction signals;
a phase arithmetic portion configured to calculate a phase which represents the position of the object to be detected based on the two error correction signals;
a storage portion configured to store sampled data of the two error correction signals sampled with respect to each of a plurality of sampling phases based on the two error correction signals and the calculated phase; and
a Fourier transform portion configured to obtain coefficients $\alpha_k$, $\beta_k$, $\gamma_k$, and $\delta_k$ of each term in two expressions representing the two error correction signals by performing a Fourier transform on the sampled data, the two expressions being represented as follows:

$$A^* = \alpha_0 + \alpha_1 \cos\theta + \beta_1 \sin\theta + \ldots + \alpha_k \cos k\theta + \beta_k \sin k\theta$$

$$B^* = \gamma_0 + \gamma_1 \cos\theta + \delta_1 \sin\theta + \ldots + \gamma_k \cos k\theta + \delta_k \sin k\theta,$$

where A* and B* are the sampled data of the two error correction signals, $\theta$ is a phase of the sampled data of the two error correction signals, and k is not less than 2,
wherein the error prediction value used by the arithmetic portion is updated iteratively using the obtained coefficients.

2. A detection apparatus according to claim 1, wherein the plurality of sampling phases are phases obtained by equally dividing $2\pi$ by $2^M$, where M is not less than 3.

3. A detection apparatus according to claim 1, further comprising:
a detection portion configured to output the two signals; and
a correction portion configured to perform a correction so that an error of each of the two error correction signals is reduced using the obtained coefficients.

* * * * *